United States Patent
Asano et al.

(10) Patent No.: US 6,735,681 B2
(45) Date of Patent: May 11, 2004

(54) PROCESSOR AND BRANCH PREDICTION METHOD

(75) Inventors: Shigehiro Asano, Yokosuka (JP); Takashi Yoshikawa, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 137 days.

(21) Appl. No.: 09/794,063

(22) Filed: Feb. 28, 2001

(65) Prior Publication Data

US 2001/0037446 A1 Nov. 1, 2001

(51) Int. Cl.⁷ .............................................. G06F 12/00
(52) U.S. Cl. ........................ 711/204; 712/233; 712/239; 712/240; 711/123; 711/213
(58) Field of Search ................................. 711/123, 204, 711/213; 712/233, 239, 240

(56) References Cited

U.S. PATENT DOCUMENTS

| | | | |
|---|---|---|---|
| 5,752,014 A | * | 5/1998 | Mallick et al. ............. 712/240 |
| 5,805,878 A | * | 9/1998 | Rahman et al. ............. 712/239 |
| 6,247,122 B1 | * | 6/2001 | Henry et al. ................. 712/239 |
| 6,427,206 B1 | * | 7/2002 | Yeh et al. .................... 712/239 |
| 6,457,117 B1 | * | 9/2002 | Witt ............................. 712/213 |

* cited by examiner

Primary Examiner—Reba I. Elmore
Assistant Examiner—Kathy Takeguchi
(74) Attorney, Agent, or Firm—Oblon, Spivak, McClelland, Maier & Neustadt, P.C.

(57) ABSTRACT

A next address computing section contains a selector and is connected to an instruction cache. The instruction cache maintains a predecode result of a branch instruction or predefined settings for a field in this branch instruction. Based on this information maintained in the instruction cache, the selector determines whether the compiler performed a branch prediction about the branch instruction or could not perform that branch prediction. When the compiler could not perform the branch prediction, the selector selects an output from a conditional branch prediction device (saturation counter section). When the compiler performed the branch prediction, the selector selects a prediction result by the compiler for a prediction in Agree mode. These selection results are used for setting a value of a register holding the next address. Based on this next-address register value, an instruction is fetched from the cache then inserted into a pipeline.

13 Claims, 5 Drawing Sheets

FIG. 1

| | PREDECODE 1 / PREDECODE 0 |
|---|---|
| UNCONDITIONAL BRANCH | 1/0 |
| CONDITIONAL BRANCH PREDICTED TO BE SUCCESSFUL BY COMPILER | 1/0 |
| CONDITIONAL BRANCH PREDICTED TO BE UNSUCCESSFUL BY COMPILER | 0/0 |
| CONDITIONAL BRANCH UNPREDICTABLE BY COMPILER | X/1 |
| OTHER INSTRUCTIONS | 0/0 |

```
ADD  R5,R3,R4           ;ADD R3 AND R4 AND PLACE RESULT IN R5
ADD  R2,R5,R6           ;ADD R5 WITH R6 AND RESULT IN R2
BREQ R2,R4,LABEL1       ;GO TO LABEL1 WHEN R2 AGREES WITH R4
LW   R8,(R9)            ;PLACE MEMORY CONTENT ADDRESSED BY R9 IN R8
AND  R11,R8,R7          ;AND R8 WITH R7 AND PLACE RESULT IN R11
ADD  R12,R13,R11        ;ADD R13 AND R11 AND PLACE RESULT IN R12
LABEL1:
OR   R11,R8,R7          ;OR R8 WITH R7 AND PLACE RESULT IN R11
ADD  R12,R13,R14        ;ADD R13 AND R14 AND PLACE RESULT IN R12
LW   R1,(R12)           ;PLACE MEMORY CONTENT ADDRESSED BY R2 IN R1
      ⋮
```

FIG. 6

|   | CYCLE N | CYCLE N+1 | CYCLE N+2 | CYCLE N+3 |
|---|---|---|---|---|
| F | AND R11,R8,R7 | OR R11,R8,R7 | ADD R12,R13,R14 | LW R1,(R12) |
| D | LW R8,(R9) | CANCEL | OR R11,R8,R7 | ADD R12,R13,R14 |
| E | BREQ R2,R4,LABEL1 | CANCEL | CANCEL | OR R11,R8,R7 |
| M | AND R2,R5,R6 | BREQ R2,R4,LABEL1 | CANCEL | CANCEL |
| W | ADD R5,R3,R4 | AND R2,R5,R6 | BREQ R2,R4,LABEL1 | CANCEL |

PROCESSOR AND BRANCH PREDICTION METHOD

CROSS-REFERENCE TO RELATED APPLICATIONS

This application is based upon and claims the benefit of priority from the prior Japanese Patent Application No. 2000-053820, filed Feb. 29, 2000, the entire contents of which are incorporated herein by reference.

BACKGROUND OF THE INVENTION

The present invention relates to a processor having a branch prediction capability of a conditional branch instruction and a branch prediction method of the same processor.

During program execution on a pipelined processor, a conditional branch instruction is executed when a given condition for this instruction becomes true. There may be the case where an instruction is previously inserted into a pipeline and is not executed yet. In this case, while a new instruction at the branch destination is inserted into the pipeline, the processor cannot perform effective operations, degrading throughput. This phenomenon is called "branch penalties".

The following describes how a branch penalty occurs using an example of a RISC processor having a 5-stage pipeline.

The 5-stage pipeline for an ordinary RISC processor comprises:

F stage (fetching instructions)
D stage (decoding instructions)
E stage (executing instructions)
M stage (accessing memory)
W stage (writing to a register file)

Figure 6:
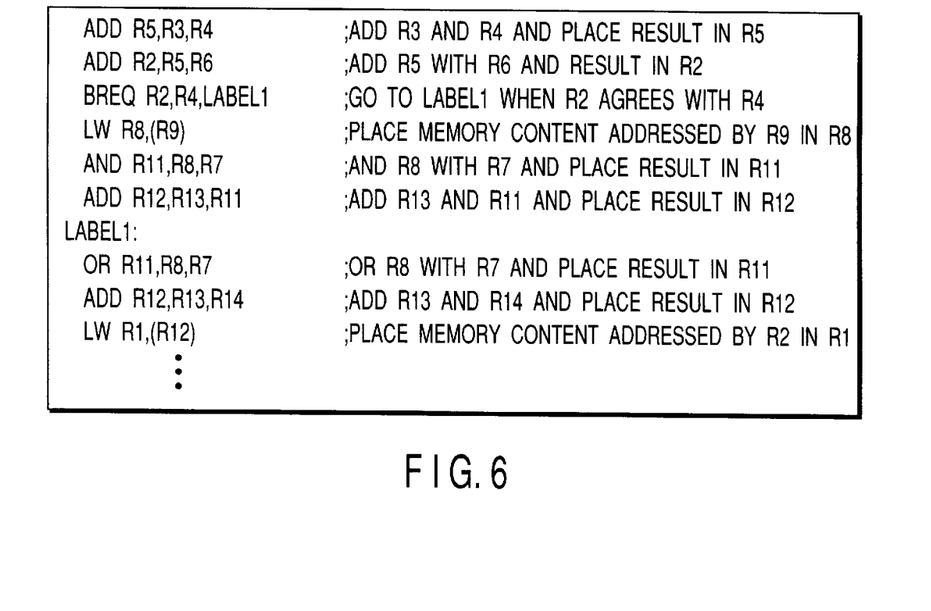
FIG. 6 shows an example of an instruction sequence.
Figure 7:
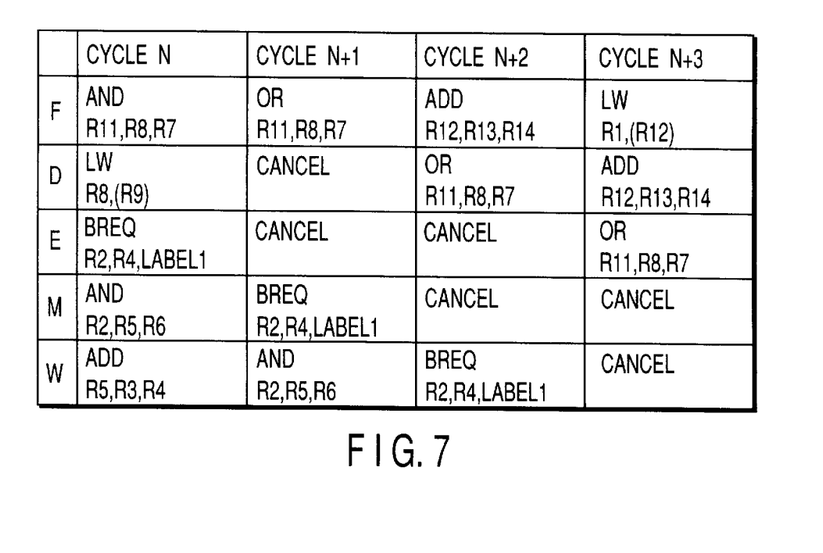
FIG. 7 shows a pipeline state at each cycle when the instruction sequence in FIG. 6 is executed.

FIG. 6 shows an instruction sequence executed on this 5-stage pipeline. In this case, the pipeline presents states as shown in FIG. 7.

With respect to the instruction sequence in FIG. 6, an instruction "BREQ R2, R4, LABEL1" is executed in the E stage at a given cycle N It is judged whether there is an agreement (true) or not (false) between an R2 register value and an R4 register value. When the branch condition is true, a branch is successful, while the branch condition is false, a branch is unsuccessful.

In this cycle N, the above BREQ instruction is followed by an instruction "LW R8, (R9)" at the D stage and an instruction "AND R11, R8, R7" at the F stage.

When a BREQ result is false in the previous cycle N, the pipeline processing may continue in the cycle N+1. When a BREQ result is true as shown in FIG. 7, however, the processor cancels the instruction "LW R8, (R9)" at the D stage and the instruction "AND R11, R8, R7" at the F stage in the previous cycle N. The processor must begin with a fetch operation anew from the instruction "AND R11, R8, R7" at the branch destination. Namely, in this example, no instructions are executed during two cycles after the BREQ instruction, wasting cycles.

While the above example uses the 5-stage pipeline, improvement of processor frequencies requires more pipeline stages. As the number of pipeline stages increases, branch penalties also tend to increase.

Dynamic branch prediction may be used for decreasing branch penalties. This method is used for predicting branch condition values in the future according to true or false values for the conditions in the past. Generally, when a condition was often true in past conditional branches, that condition is predicted to be true. When a condition was often false in past conditional branches, that condition is predicted to be false. Basically, a saturation counter implements a system for reflecting a tendency for past conditional branches on the branch prediction. For example, the system using a 2-bit saturation counter implements a state transition as shown in FIG. 8.

Figure 8:
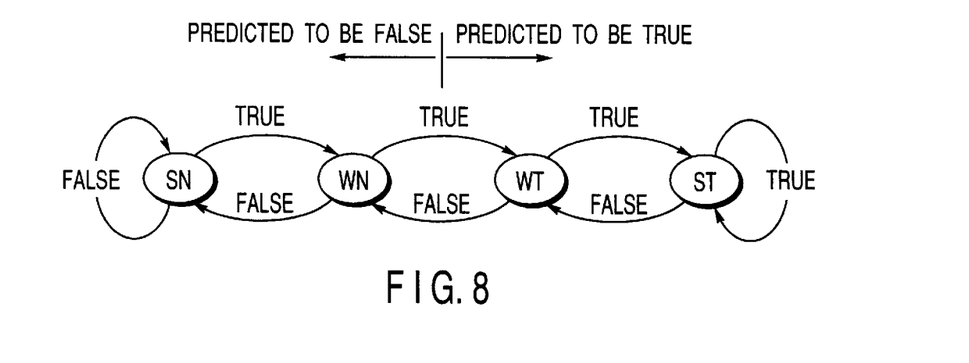
FIG. 8 explains a saturation counter in Taken mode.

In the state transition diagram of FIG. 8, an arrow marked with TRUE shows state transition when a conditional branch becomes true. An arrow marked with FALSE shows state transition when a conditional branch becomes false. Each time a conditional branch instruction is executed to provide a true or false value, this value controls state transition among four states: SN (Strongly Not Taken), WN (Weakly Not Taken), WT (Weakly Taken), and ST (Strongly Taken). For predicting whether the conditional branch instruction becomes true or false, the conditional branch is predicted to be true when the saturation counter state is WT or ST. It is predicted to be false when the saturation counter state is SN or WN.

In this case, branch prediction is performed according to a true or false result of the conditional branch. This is called a Taken mode.

Ideally, there would be provided saturation counter hardware for each of all conditional branch instructions. However, this is not practical from the viewpoint of costs. Generally, there is provided a specified number of saturation counters in table formats. Each conditional branch instruction is associated with a table entry by using, say, a hash function which uses a conditional branch instruction address as an input. This method can limit the number of hardware resources. However, there is the problem that a conflict occurs between two or more conditional branch instructions that use the same table entry, namely, the same saturation counter. In this case, a conflict means that the same saturation counter is assigned with a conditional branch instruction with a great possibility of being true and another with a great possibility of being false.

To solve this conflict, there is provided an Agree mode which uses a compiler for conditional branch prediction during state transition of saturation counters.

In the Agree mode, the compiler predicts a true or false condition value for each conditional branch instruction during program compilation. According to a prediction result, the compiler sets a tag value to be added to the corresponding instruction. Alternatively, the compiler selectively uses two types of instructions: one predicting the conditional branch to be true and the other predicting the conditional branch to be false. By doing so, the compiler notifies the processor of a prediction result concerning the true or false condition value for each conditional branch instruction. The Agree mode differs from the above-mentioned mode which provides state transition based on a true or false result of the conditional branch. The saturation counter in the Agree mode provides state transition based on whether the conditional branch (true or false) agrees with the compiler prediction (true or false). For example, a 2-bit saturation counter provides state transition as shown in FIG. 9.

Figure 9:
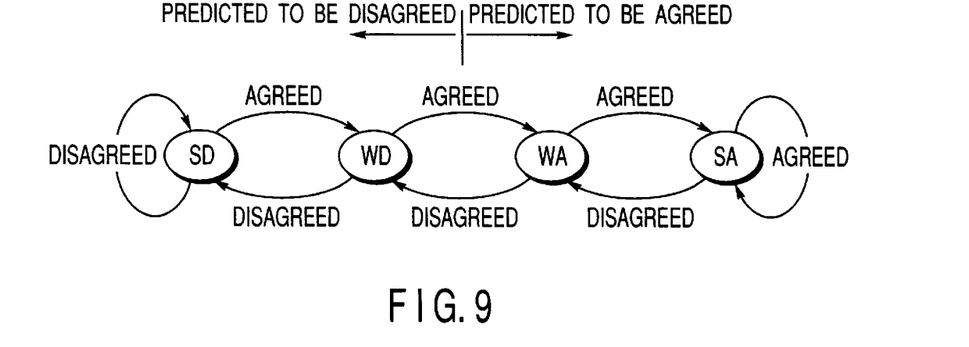
FIG. 9 explains a saturation counter in Agree mode.

In the state transition diagram of FIG. 9, an arrow marked with AGREE indicates state transition when the result agrees with the compiler prediction. An arrow marked with DISAGREE indicates state transition when the result does not agree with the compiler prediction. The conditional branch instruction is executed to determine the true or false value. Each time the compiler prediction is agreed or disagreed, the agreed or disagreed result controls state transition among four states: SD (Strongly Disagree), WD (weakly Disagree), WA (Weakly Agree), and SA (Strongly Agree). The conditional branch instruction is predicted to be true or false as follows. When the saturation counter state is WA or SA, the conditional branch agrees with the compiler prediction. Namely, when the compiler predicts a result to be true, the true result is predicted. When the compiler predicts a result to be false, the false result is predicted. When the saturation counter state is SD or WD, the conditional branch does not agree with the compiler prediction. Namely, when the compiler predicts a result to be true, the false result is predicted. When the compiler predicts a result to be false, the true result is predicted.

The use of this Agree mode can solve the problem of conflicts and provide the same effect as practically increasing the number of entries. As mentioned above, a conflict occurs when the same saturation counter is assigned with a conditional branch instruction with a great possibility of being true and another with a great possibility of being false. In this case, the saturation counter can be the same entry in a table constituting the saturation counter.

Apart from the problem of branch conflicts, however, the Agree mode still needs to improve branch prediction accuracy.

BRIEF SUMMARY OF THE INVENTION

It is an object of the present invention to provide a processor which can eliminate problems such as saturation counter contamination, improve prediction accuracy for conditional branch instructions, and thus improve processor throughput.

According to one aspect of the present invention, there is provided a processor comprising: an instruction cache configured to fetch a first instruction from a program stored in a memory; a decoding section, connected to the instruction cache, configured to decode the first instruction fetched in the cache; an executing section, connected to the decoding section, configured to execute the decoded first instruction; and an address computing section, connected between the instruction cache and the execute section, configured to compute an address of a second instruction to be fetched into the instruction cache when the decoded first instruction is a branch instruction, the address computing section including: a section configured to detect a result of a former branch prediction of the first instruction; a section configured to compute the address according to the result of the former branch prediction unless the result represents an impossibility of prediction; a section configured to confirm a successful prediction by comparing the result of the former branch prediction with a branch condition result ascertained from an execution of the first instruction; and a register in which the computed address is set when the successful prediction is confirmed.

According to another aspect of the present invention, there is provided a branch prediction method of predicting an address of a second instruction to be fetched into an instruction cache when a first instruction previously fetched into the cache is a branch instruction, the method comprising: detecting a result of a former branch prediction of the first instruction; computing the address according to the result of the former branch prediction unless the result represents an impossibility of prediction; confirming a successful prediction by comparing the result of the former branch prediction with a branch condition result ascertained from an execution of the first instruction; and outputting the computed address to the cache when the successful prediction is confirmed.

DETAILED DESCRIPTION OF THE INVENTION

An embodiment of the present invention will be described in further detail with reference to the accompanying drawings.

In this embodiment, a compiler predicts a true or false branch condition value for a conditional branch instruction. The compiler may be incapable of predicting a true or false value of conditional branch instructions. Alternatively, the compiler may determine not to predict a true or false value of conditional branch instructions. For these instructions, the compiler makes it identifiable that the compiler did not perform prediction.

A processor according to this embodiment identifies whether or not the compiler predicted a true or false value for the conditional branch instruction. The processor operates accordingly to the result.

There may be available various modes for handling the conditional branch instruction based on an identification result. For example, four modes are available as follows.

(1) When the compiler does not predict a true or false value for the conditional branch instruction, conditional branch prediction is performed in the Taken mode. When the compiler predicts a true or false value for the conditional branch instruction, the compiler's prediction takes effect.

(2) When the compiler does not predict a true or false value for the conditional branch instruction, conditional branch prediction is performed in the Taken mode. When the compiler predicts a true or false value for the conditional branch instruction, conditional branch prediction is performed in the Agree mode.

(3) When the compiler does not predict a true or false value for the conditional branch instruction, no conditional branch prediction is performed. For example, a false value is always predicted. When the compiler predicts a true or false value for the conditional branch instruction, the compiler's prediction takes effect.

(4) When the compiler does not predict a true or false value for the conditional branch instruction, no conditional branch prediction is performed. For example, a false value is always predicted. When the compiler predicts a true or false value for the conditional branch instruction, conditional branch prediction is performed in the Agree mode.

There may be various methods in addition to the above.

When the compiler does not predict a true or false value for the conditional branch instruction, this instruction disadvantageously affects prediction of a conditional branch instruction which is predicted by the compiler with respect to a true or false value. This embodiment can prevent this problem, increasing throughput of the conditional branch prediction.

The following describes the above method (1) as an example. Obviously, the other methods are likewise feasible.

There can be provided various methods of identifying three prediction results, namely predictable/successful branch, predictable/unsuccessful branch, and unpredictable, generated by the compiler concerning conditional branch instructions having the same function.

For example, these methods may include:

(a) The same conditional branch instruction is expanded into three types of instructions corresponding to three results of predictable/successful branch, predictable/unsuccessful branch, and unpredictable. The compiler uses these three types of instructions accordingly.

(b) Alternatively, the instruction is provided with first and second fields. The first field indicates a predictable or unpredictable value. The second field indicates a successful (true) or unsuccessful (false) branch. This field indicates "don't care" for an unpredictable value. The compiler sets these fields.

The processor is capable of three types of identifications such as predictable/successful branch, predictable/unsuccessful branch, and unpredictable by decoding or predecoding the instruction in the case of (a) or by referencing the above-mentioned fields in the case of (b).

The following describes how to find a probability that the prediction will be met through the use of the method (1) above.

Conditional branch instruction A: Predicted to be true by the compiler. Actually, this instruction will be true with an 80% probability. In this case, the identification is predictable/successful branch.

Conditional branch instruction B: Predicted to be false by the compiler. Actually, this instruction will be false with an 80% probability. In this case, the identification is predictable/unsuccessful branch.

Conditional branch instruction C: Unpredictable by the compiler. Actually, this instruction will be true with a 70% probability. In this case, the identification is unpredictable.

It should be noted that the three conditional branch instructions are assumed to occur with the same frequency during program execution and have the following characteristics.

The compiler can predict the conditional branch instructions A and B. These instructions are not reflected on saturation counters. Namely, they follow the compiler prediction. Accordingly, the branch prediction will be met with a 0.8 probability regarding the conditional branch instructions A and B.

By contrast, the conditional branch instruction C is reflected on saturation counters. The conditional branch instruction C causes state transition toward the true side with a 0.7 probability and toward the false side with a 0.3 probability. The similar computation for the above-mentioned SA, WA, WD, and SD is used to find probabilities for the saturation counter states ST, WT, WN, and SN as follows.

$ST = 0.7 \times 0.7 \times 0.7 / (1 - 2 \times 0.7 + 2 \times 0.7 \times 0.7) = 0.591374$ $WT = ST \times (1-0.7)/0.7 = 0.253448$ $WN = WT \times (1-0.7)/0.7 = 0.108621$ $SN = WN \times (1-0.7)/0.7 = 0.046552$ In this method, the following shows the probability of realizing the branch prediction in this example.

$(0.8 + 0.8 + (ST+WT) \times 0.7 + (WN+SN) \times (1-0.7))/3 = 0.745977$

This is greater than the probability (0.56639) which is applied to the above conditional branch instructions A, B, and C when the Agree mode is used at the same entry.

The following describes this embodiment in more detail.

First, an instruction set is described.

This embodiment classifies one conditional branch instruction into three categories as follows.

The compiler cannot predict the conditional branch.

The compiler can predict the conditional branch to be successful.

The compiler can predict the conditional branch to be unsuccessful.

The compiler applies these three categories to every conditional branch instruction and generates a corresponding conditional branch instruction.

For example, such a conditional branch instruction is implemented by:

Providing three corresponding OP codes for one conditional branch instruction, or Providing an instruction code with a field for identifying three categories independently of the OP code.

Here is an example of the conditional branch instruction: BRZ R1, R2, Label. This instruction compares contents in registers R1 and R2, and then branches to Label when these registers stores the same value. For this instruction, the former method of providing three types of OP codes provides OP codes BRZU (BRZ Unpredictable), BRZT (BRZ Taken), and BRZN (BRZ Not Taken) corresponding to unpredictable, predictable/successful branch, and predictable/unsuccessful branch. This method is advantageous in that the code efficiency hardly degrades.

The latter method provides an instruction code with a 2-bit field for identifying three types of values: unpredictable, predictable/successful branch, and predictable/unsuccessful branch. Though the code efficiency degrades accordingly, it is possible to shorten the decode time or omit the predecode time for identifying these three types of values.

The following explains an example of providing the same conditional branch instruction with three types of OP codes as used for the former method. Namely, this method allows the compiler to appropriately use three types of OP codes corresponding to unpredictable, predictable/successful branch, and predictable/unsuccessful branch.

This embodiment performs predecoding when an instruction cache is filled with these instructions to generate identification information for identifying three types of information: unpredictable, predictable/successful branch, and predictable/unsuccessful branch.

As will be described later in detail, this embodiment applies the same arrangement to conditional branch instructions, unconditional branch instruction, and non-branch instructions. Unconditional branch instructions use the identification information indicating predictable/successful branch. Non-branch instructions use the identification information indicating predictable/unsuccessful branch.

Figure 1:
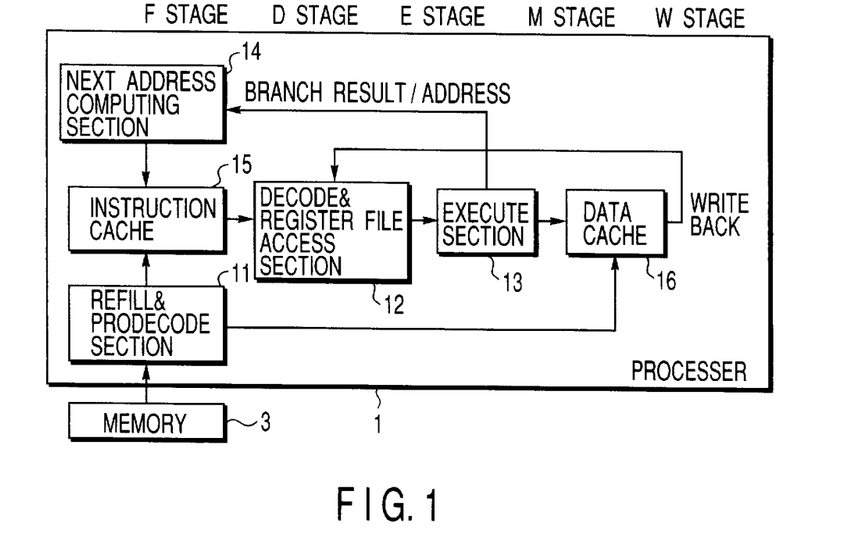
FIG. 1 shows a configuration example of a processor according to an embodiment of the present invention.

FIG. 1 is a block diagram showing a configuration example of a processor according to this embodiment.

The embodiment is described by using an example of a RISC processor having a 5-stage pipeline comprising:

F (Fetch) stage

D (Decode) stage

E (Execute) stage

M (Memory) stage

W (Writeback) stage

As shown in FIG. 1, a processor 1 comprises a refill & predecode section 11, a decode & register file access section 12, an executing section 13, a next address computing section 14, an instruction cache 15, and a data cache 16. Memory 3 is connected to the refill & predecode section 11 of the processor 1.

In FIG. 1, each block connection corresponds to the associated stage. FIG. 1 exemplifies a single-processor. It can be a VLIW (very Long Instruction Word) processor which statically allocates resources during compilation. Alternatively, it can be a super-scalar processor which dynamically allocates resources during execution.

Basically, the processor's 5-stage pipeline operates as follows.

At the F stage, the instruction cache 15 is accessed. Then, at the D stage, the decode & register file access section performs decoding and accesses a register file.

At the E stage, the executing section 13 computes data read from the register file. When a conditional branch instruction is issued, it is checked whether the branch condition is true or false. When the condition is true, the executing section finds a branch destination address. When the condition is false, the executing section finds an address of an instruction next to the current conditional branch instruction.

At the M stage, the data cache 16 is accessed.

At the W stage, the processor writes a result of accessing the data cache 16 or a result of operations by the executing section 13 onto a register file.

The following outlines a processing procedure of the next address computing section 14.

The next address computing section 14 predicts an address to be fetched next when a conditional branch instruction is fetched at the F stage.

Executing the conditional branch instruction at the E stage first evidences whether or not the conditional branch instruction's branch condition is satisfied.

At the M stage, the next address computing section 14 operates according to an execution result (true or false) of the conditional branch instruction's branch condition and successful or unsuccessful prediction, namely agreement or disagreement between the execution result and the prediction. This section resets an actual next address when the prediction fails. When the result predicted to be true becomes false, the current instruction address +1 is used. When the result predicted to be false becomes true, a branch destination address is used. The section updates the saturation counter when the compiler assumes the conditional branch instruction to be unpredictable.

It should be noted that this embodiment processes unconditional branch instructions and non-branch instructions assuming that the predication always succeeds.

This embodiment uses the following identification information for predicting conditional branches.

When the instruction cache 15 or the data cache 16 is missed, the refill & predecode section 11 is used to refill the instruction cache 15 or the data cache 16 with data from the memory 3. When the instruction cache 15 is missed, the embodiment refills data and predecodes the OP code in the instruction for the branch prediction. For each instruction, a predecode operation generates 2-bit identification information based on a code output from the compiler and appends it to the instruction. This identification information is used for identifying the above-mentioned three types of information (unpredictable, predictable/successful branch, and predictable/unsuccessful branch).

The identification information comprises predecode0 and predecode1, each having the following meaning.

predecode0: Value 1 indicates a unpredictable state by the compiler. Value 0 indicates a predictable state by the compiler.

predecode1; When predecode0=0, value 1 indicates that the compiler predicts the condition to be successful. Value 0 indicates that the compiler predicts the condition to be unsuccessful.

This identification information is saved together with the instruction in the instruction cache 15 and is used for the next address computing section 14.

This embodiment applies the same processing to unconditional branch instructions using predecode0=0 and predecode1=1, and to non-branch instructions using predecode0=0 and predecode1=0.

Figure 2:
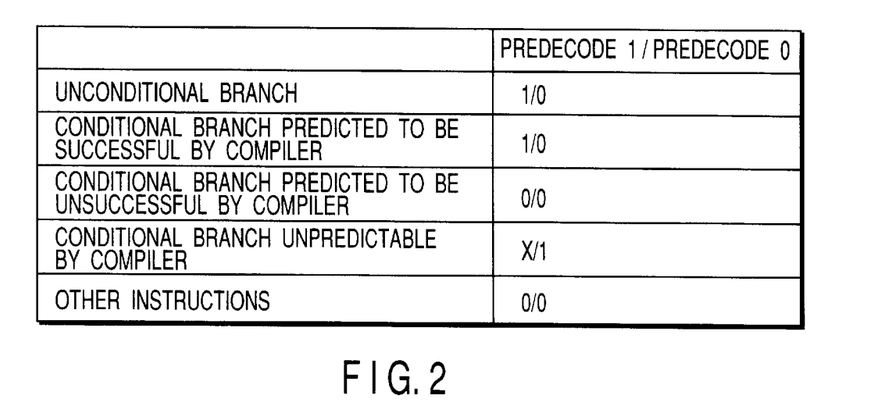
FIG. 2 shows an example of identification information according to an embodiment.

Consequently, the embodiment configures the identification information as shown in FIG. 2. In FIG. 2, "X" means "Don't Care".

The following describes next address computing section 14 in detail.

Figure 3:
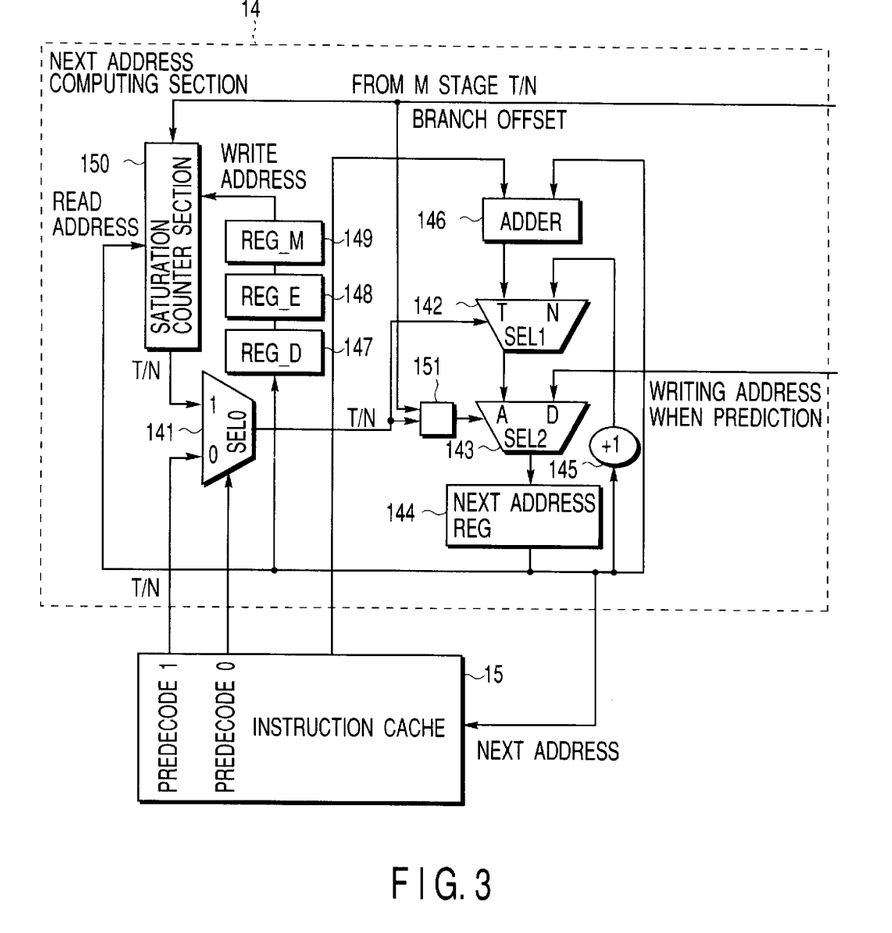
FIG. 3 shows a configuration example of a next address computing section according to an embodiment.

FIG. 3 shows a configuration example of the next address computing section 14.

As shown in FIG. 3, the next address computing section 14 includes a first selector (SEL0) 141, a second selector (SEL1) 142, a third selector (SEL2) 143, a next-address register (Next Address REG) 144, an addition circuit 145, an adder (ADDER) 146, a saturation counter section 150, 3-stage registers (REG_D, REG_E, REG_M) 147 through 149, and a prediction check circuit 151.

The next-address register 144 maintains an address of the instruction to be fetched next. The next-address register 144 provides the instruction cache 15 with the address of the instruction to be fetched.

The adder 146 provides a branch offset in the instruction from the instruction cache 15 and appends branch offset to the content of the next-address register 144. When the instruction cache 15 provides severe timing, a branch address cache (BAC) is used instead of the adder.

The addition circuit 145 increments the content of the next-address register 144 by 1.

The first selector (SEL0) references predecode0 attached to the instruction in the instruction cache 15. When predecode0=1, the first selector (SEL0) outputs prediction information from a hardware prediction device, namely the saturation counter section 150. The prediction information contains, say, 1 to indicate a true state, namely a successful branch. Alternatively, it contains, say, 0 to indicate a false state, namely an unsuccessful branch. When predecode0 =0, the first selector (SEL0) outputs predecode1 attached to the instruction in the instruction cache 15. When the compiler assumes a conditional branch instruction to be unpredictable, the first selector (SEL0) outputs the prediction information from the saturation counter section 150. When the compiler assumes an instruction to be predictable/ successful branch or recognizes an unconditional branch instruction, the first selector (SEL0) outputs predecode1=1. When the compiler assumes an instruction to be predictable/ unsuccessful branch or recognizes a non-branch instruction, the first selector (SEL0) outputs predecode1=0.

An output from the first selector (SEL0) activates the second selector (SEL1).

When the first selector (SEL0) outputs a value, say, 1 for indicating a successful branch, the second selector (SEL1) selects an output from the adder 146 which adds a branch offset value to the value of the next-address register 144. When the first selector (SEL0) outputs a value, say, 0 for indicating an unsuccessful branch, the second selector (SEL1) selects an output from the addition circuit 145 which increments a value of the next-address register 144 by 1. Namely, the second selector (SEL1) outputs a branch destination address when the conditional branch is predicted to be successful or an unconditional branch instruction is detected. The second selector (SEL1) outputs a next address when the conditional branch is predicted to be unsuccessful or a non-branch instruction.

An output from the second selector (SEL1) is used as an input to the third selector (SEL2). Unless the prediction fails, the third selector (SEL2) selects an output from the second selector (SEL1) and places it in the next-address register 144.

An output from the prediction check circuit 151 activates the third selector (SEL2).

The prediction check circuit 151 maintains the prediction of each instruction, namely an output from the first selector (SEL0). At the M stage, the prediction check circuit 151 inputs a conditional branch result of the instruction executed at the E stage. This result is assumed to be successful branch for unconditional branch instructions, or to be unsuccessful branch for non-branch instructions. A comparison is made between the first selector (SEL0) output and the conditional branch result. When the prediction agrees with the result, the prediction check circuit 151 outputs information, say, 1 for indicating successful prediction. When the prediction differs from the result, the prediction check circuit 151 outputs information, say, 0 for indicating unsuccessful prediction.

At the M stage, the executing section 13 provides the third selector (SEL2) with an address of an instruction to be executed subsequently to the instruction which is actually established at the E stage. Namely, when the conditional branch instruction results in a successful branch, a branch destination address is provided. When the conditional branch instruction results in an unsuccessful branch, an address next to the relevant instruction is provided.

For unconditional branch instructions, a branch destination address may be provided. For non-branch instructions, an address next to the relevant instruction may be provided. However, these instructions are always treated to be successful prediction.

When the prediction check circuit 151 outputs a value indicating successful prediction, the third selector (SEL2) selects an output from the second selector (SEL1). When the prediction check circuit 151 outputs a value indicating unsuccessful prediction, the third selector (SEL2) selects an actual address provided by the executing section 13. Namely, when the prediction succeeds with respect to a conditional branch instruction, the next-address register 144 holds an output from the second selector (SEL1). This operation also takes effect during execution of unconditional branch instructions or non-branch instructions. When the predication fails, the next-address register 144 holds an actual address provided by the executing section 13.

The following describes in detail a configuration of prediction hardware, namely a saturation counter section.

Figure 4:
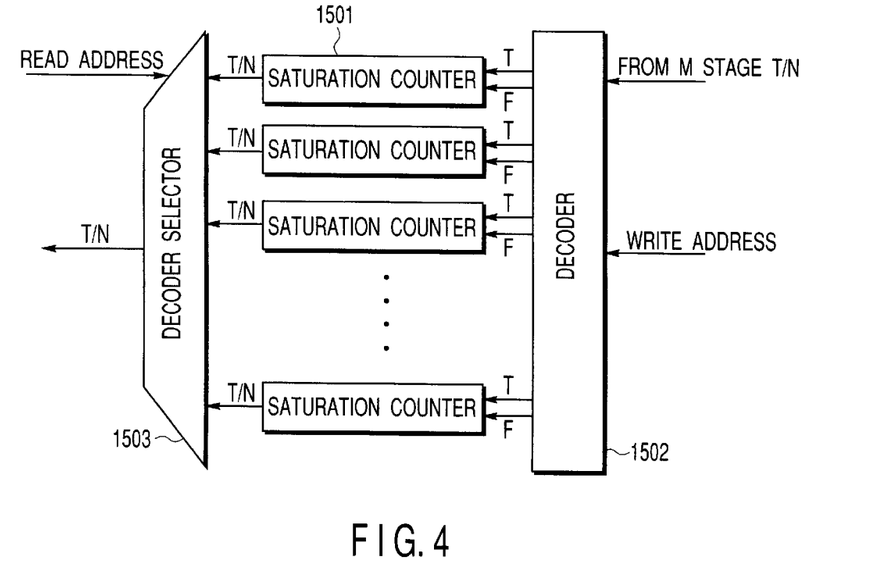
FIG. 4 shows a configuration example of a saturation counter section according to an embodiment.

FIG. 4 shows a configuration example of the saturation counter section 150.

The saturation counter section 150 in the Taken mode includes a decoder 1502, a plurality of saturation counters 1501, and a decoder selector 1503.

A plurality of saturation counters 1501 is hashed by conditional branch instruction addresses. A hashing function may be so simple as to use low-order bits in an address.

The saturation counter section 150 has two address ports. One is for the decoder 1502 during writing. The other is for the decoder selector 1503 during reading.

During a write (update) operation, the 3-stage registers 147 through 149 (REG_D, REG_E, REG_M) provide write addresses which are shifted for three cycles later. This is because data is written to the saturation counter 1501 at the M stage next to the E stage which determines whether the conditional branch is successful or unsuccessful.

A state transition signal is sent to one of the saturation counters according to write addresses and the successful or unsuccessful conditional branch result from the M stage.

In this example, a write operation to the saturation counter 1501 occurs only for conditional branch instructions assumed to be unpredictable by the compiler, namely only when predecode0=1 is effective. The predecode0 value is shifted for three cycles later by means of the 3-stage registers 147 through 149 (REG_D, REG_E, REG_M) and is supplied to the saturation counter section 150.

During a read operation, a read address specifies which saturation counter 1501 should be selected. One of the saturation counters outputs prediction information about the conditional branch.

For explanation's sake, the hash method here uses just low-order bits in an address. However, various methods are available and any of them can be used.

The above-mentioned method (1) is explained as an example. Obviously, the other methods are also available.

The method (2) applies to conditional branch instructions which the compiler assumes to be predictable. In this case, the saturation counter section operates in the Agree mode and feeds back a prediction check circuit output. The configuration in FIG. 3 can be modified as follows. The second selector (SEL1) is supplied with the compiler's prediction result when an output from the saturation counter section results in an agreement. The second selector (SEL1) is supplied with a prediction opposite to the compiler's prediction result when an output from the saturation counter section results in a disagreement. For example, a 1-bit inverter circuit is used for generating a prediction opposite to the compiler's prediction result. In this case, the saturation counter section in the Agree mode is used for conditional branch instructions assumed to be predictable by the compiler. The saturation counter section in the Taken mode is used for conditional branch instructions assumed to be unpredictable by the compiler. The saturation counter section is not used for unconditional branch instructions and non-branch instructions. At this time, the identification information requires 3 bits because it is necessary to distinguish among states: predictable/successful branch, predictable/unsuccessful branch, and unpredictable. More particularly, a conditional branch instruction needs to be checked whether it is predictable/successful branch or predictable/unsuccessful branch. Also, it is necessary to determine whether the instruction assumed to be unpredictable is a conditional branch instruction, an unconditional branch instruction, or a non-branch instruction. For example, it may be preferable to newly add predecode2 to the example in FIG. 2 so that predecode2=0 indicates a conditional branch instruction and predecode2=1 indicates otherwise. It should be noted that other configurations for identification information are available.

In the method (4), for example, the configuration in FIG. 3 can be modified as follows. With respect to an instruction which the compiler assumes to be predictable, the second selector (SEL1) is supplied with an output from the saturation counter section. In this case, the saturation counter section operates in the Agree mode and feeds back a prediction check circuit output. With respect to an instruction whose true or false value the compiler did (could) not predict, the second selector (SEL1) is supplied with, say, a value indicating unsuccessful branch.

The above example uses three OP codes for one conditional branch instruction. However, when an instruction code contains a field for identifying the three types of information independently of the OP codes, predecoding for the identification becomes unnecessary. Just referencing or copying this field can provide an equivalent function.

This embodiment can predict conditional branch instructions with higher precision than the conventional system, improving processor throughput.

The following describes the compiler according to this embodiment.

The following description provides a heuristic example, showing in which cases a conditional branch instruction is predictable or unpredictable.

It is known that the conditional branch instruction becomes true with a high probability toward backward locations in an ordinary program, namely toward smaller program counters. This is because the conditional branch instruction is used toward backward locations when a loop such as a FOR loop is executed repeatedly, say, in a C program. The conditional branch instruction can be predicted to be false for a goto statement which is only used for error processing in a C program. In the other cases, it is generally difficult for the compiler to predict conditional branch instructions toward forward locations before execution.

The heuristic example is summarized as follows.

(1) A conditional branch instruction toward backward locations is predicted to be true.

(2) When a goto statement is executed as a result of conditions, this statement is predicted to be false.

(3) A conditional branch instruction toward forward locations is assumed to be unpredictable.

Obviously, other various heuristics are available.

The following describes a processing flow of a compiler using a heuristic for determining which prediction to be applied to conditional branch instructions as mentioned above.

Figure 5:
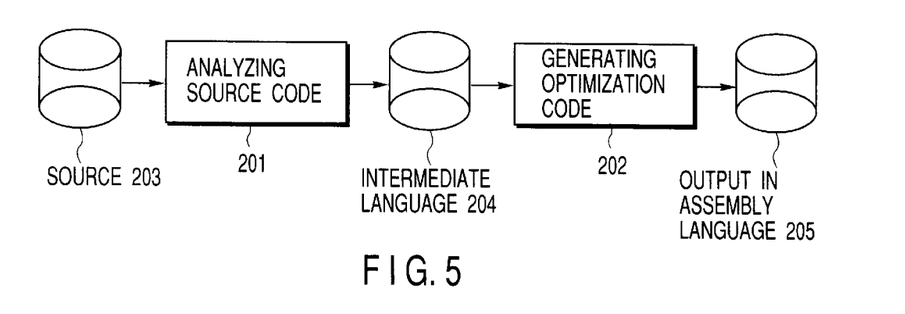
FIG. 5 exemplifies an operational procedure of a compiler according to an embodiment.

FIG. 5 exemplifies an operational procedure (functional blocks) of the compiler according to this embodiment.

This compiler first generates an intermediate language which is generally independent of the processor architecture, then generates it as a code optimized for the architecture and an instruction set. It is desirable not only to apply the above-mentioned determination heuristic to the intermediate language, but also to consider a source analysis result. For this purpose, a source analysis result may be added to the intermediate language. For example, when the conditional branch instruction is used for error processing as mentioned in the item (2) above, the intermediate language is provided with tag information showing the relevant condition.

As shown in FIG. 5, the compiler analyzes a source program (source code) 203 written in a high-level language for generating an intermediate language 204 (201). This analysis processing includes, say, lexical analysis, syntactical analysis, and the like. At this stage, tag information as mentioned in (2) is added to the intermediate language 204.

Then, the intermediate language 204 is subject to optimization and code generation for outputting a program (object program) 205 in the assembly language (202). This optimization includes, say, flow analysis, data dependency analysis, instruction scheduling (instruction allocation), register allocation, and the like. At this stage, the code generation is performed according to the heuristic conditions (1) and (3) above and the tag information appended during the analysis.

For example, a conditional branch instruction compares contents of registers specified in first and second operands. When they agree with each other, the instruction branches to a label specified in a third operand. When the condition (1) above is applied, the instruction generates BRZT indicating predictable/successful branch. When the condition (2) above is applied, the instruction generates BRZN indicating predictable/unsuccessful branch. When the condition (3) above is applied, the instruction generates BRZU indicating unpredictable.

Independently of the OP codes, an instruction code may include a field for identifying the three types of information. When the condition (1) above is applied, the field is assigned 1/0 to indicate predictable/successful branch. When the condition (2) above is applied, the field is assigned 0/0 to indicate predictable/unsuccessful branch. When the condition (3) above is applied, the field is assigned X/1 to indicate unpredictable (see FIG. 2). When using the configuration as shown in FIG. 3, it is preferable to assign the field 1/0 to indicate an unconditional branch instruction and 0/0 to indicate a non-branch instruction.

While the above example uses the compiler to identify three types of conditional branch instructions, a programmer may explicitly specify this identification in the assembler language. It may be preferable to use both methods. Namely, explicit specification, if any, takes precedence. When there is no explicit specification, the compiler identifies an instruction.

The above explanation chiefly relates to the single scalar processor. However, the present invention is also applicable to the VLIW or super-scalar system. Obviously, the above-mentioned configuration example can be easily expanded.

On the VLIW system, only one conditional branch instruction may be executed among concurrently executed instructions. On the super-scalar system, one of a plurality of concurrently executed execution units may execute a branch instruction. In either case, this configuration example can be applied as is by conforming a unit for executing conditional branch instructions to the configuration example.

In these cases, the compiler can generate conditional branch instructions by unchangedly using the heuristics exemplified in this embodiment.

It should be noted that each of the above functions is also feasible as software.

This embodiment is also available as a computer-readable storage medium which stores a program for allowing a computer to execute specified means, to function as specified means, or to implement specified functions.

For comparison with the present invention, the following describes performance evaluation of the branch prediction in the Agree mode according to the prior art.

In the conventional Agree mode, the compiler uses default settings to determine a true or false value for unpredictable conditional branch instructions. These settings contaminate saturation counters or table entries constituting saturation counters, degrading a prediction rate.

As shown in FIG. 9, the following describes a case where three conditional branch instructions share one saturation counter or one entry in tables constituting saturation counters. It is assumed that the three conditional branch instructions occur with the same frequency during program execution and have the following characteristics.

Conditional branch instruction A: Predicted to be true by the compiler. Actually, this instruction will be true with an 80% probability.

Conditional branch instruction B: Predicted to be false by the compiler. Actually, this instruction will be false with an 80% probability.

Conditional branch instruction C: Unpredictable and assumed to be false by the compiler. Actually, this instruction will be true with a 70% probability.

In the state transition of FIG. 9 under these conditions, the following shows how to find the probability (H) that a given state will change to an agreement.

Any state keeps the same probability H for transition along the AGREE arrow in the state transition diagram. Further, any state keeps the same probability (1-H) for transition along the DISAGREE arrow in the state transition diagram.

The state SA or WA changes to the state SA. As formulated in the following equation, the probability of being the state SA is given by the sum of "the probability (SA) of being the state SA multiplied by the agreeing probability H" and "the probability (WA) of being the state WA multiplied by the agreeing probability H".

$$SA \times H + WA \times H = SA \qquad (1)$$

Similarly, the probability (WA) of being the state WA is found by SA and WD as follows.

$$SA \times (1-H) + WD \times H = WA \qquad (2)$$

The probability (WD) of being the state WD is found by WA and SD as follows.

$$WA \times (1-H) + SD \times H = WD \qquad (3)$$

The probability (SD) of being the state SD is found by WD and SD as follows.

$$WD \times (1-H) + SD \times (1-H) SD \qquad (4)$$

The equations (2) and (1) yield the following.

$$WA = SA \times (1-H)/H \quad WD = SA \times ((1-H) - H \times (1-H))/(H \times H)$$

These WA and WD are substituted for the equation (3) to obtain the following.

$$SD = SA \times ((1-H) - H \times (1-H) - H \times (1-H) \times (1-H))/H \times H \times H$$

There is provided the condition SA+WA+WD+SD=1

Here, these WA, WD, and SD are substituted for SA+WA+WD+SD=1 to solve SA.

$$SA = H \times H \times H / (1 - 2 \times H + 2 \times H \times H)$$

The probability H is found from an average of probabilities for conditional branch instructions A, B, and C. Namely, predicting the conditional branch instruction A to be true will succeed with a 0.8 probability. Predicting the conditional branch instruction B to be false will succeed with a 0.8 probability. Predicting the conditional branch instruction C to be false will succeed with a 0.3 probability. Consequently, the probability H is found as H=(0.8+0.8+0.3)/3=0.633333. The above equations yield SA=0.474343, WA=0.27462, WD=0.15899, and SD=0.092047.

In this example, whether the conditional branch is true or false agrees with the compiler's prediction. Assuming that the probability for this prediction is AG, it is found as AG=SA+WA=0.748963. Obviously, prediction of disagreeing with the compiler is based on the probability (1-AG)=0.251037.

Here, a prediction mechanism is used for finding a probability that the prediction for conditional branch instructions will succeed.

In a first case where the prediction succeeds, the saturation counter's prediction agrees with the compiler's specification. In addition, the conditional branch actually agrees with the compiler's specification. The probability that this case will occur is:

(0.8×AG+0.8×AG+0.3×AG)/3

In a second case where the prediction succeeds, the saturation counter's prediction disagrees with the compiler's specification. In addition, the conditional branch actually disagrees with the compiler's specification. The probability that this case will occur is:

(0.2×(1−AG)+0.2×(1−AG)+0.7×(1−AG))/3

Summing up the two probabilities results in a probability of 0.56639 that the prediction will succeed in the above example.

This value works as a branch prediction, but is not so effective. This is because the saturation counter is allocated to a conditional branch instruction which the compiler cannot predict. In the example, the conditional branch instruction C decreases the probability.

When a plurality of conditional branch instructions is allocated to the same saturation counter according to the conventional branch prediction method, there is the problem that the counter is contaminated, degrading a prediction rate.

When a given instruction is a conditional branch instruction, however, the processor according to the present invention identifies whether it belongs to a first type of conditional branch instructions which a compiler predicts to be a successful branch, to a second type of conditional branch instructions which a compiler predicts to be an unsuccessful branch, or to a third type of conditional branch instructions which a compiler assumes to be unpredictable. Branch prediction processing is applied to the conditional branch instruction according to an identification result. For example, the branch prediction processing means applies different modes of branch prediction processing to conditional branch instructions identified to be the first or second type and to those identified to be the third type. This can eliminate problems such as saturation counter contamination, improve prediction accuracy for conditional branch instructions, and thus improve processor throughput.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A processor comprising:
   an instruction cache configured to fetch a first instruction from a program stored in a memory;
   a decoding section connected to the instruction cache and configured to decode the first instruction fetched in the cache;
   an executing section connected to the decoding section and configured to execute the decoded first instruction; and
   an address computing section connected between the instruction cache and the executing section and configured to compute an address of a second instruction to be fetched into the instruction cache when the decoded first instruction is a branch instruction, the address computing section including:
   a determination device configured to determine whether a branch prediction of the first instruction is performed by a compiler;
   a predicting device configured to perform a prediction in a Taken Mode to compute the address of the second instruction when the determination device has determined that the branch prediction of the first instruction is not performed by the compiler; and a register configured to store the address of the second instruction computed by the predicting device, wherein said first instruction is one of three instructions corresponding to one conditional branch instruction, each of the three instructions represent one of the following: prediction is not performed by the compiler, predictable branch successful, and predictable branch unsuccessful respectively.

2. The processor according to claim 1, wherein the predicting device includes a branch history table (BHT) in which a predetermined number of first saturation counters operating in the Taken Mode are arranged in correspondence to addresses.

3. The processor according to claim 2, wherein said predicting device performs a prediction in an Agree mode when the determination device has determined that the branch prediction of the first instruction is performed by the compiler.

4. The processor according to claim 3, further comprising a predetermined number of second saturation counters operating in the Agree Mode and arranged in correspondence to addresses, wherein a value of one of the second saturation counters is determined by comparing a value of the branch prediction of the first instruction that is predicted by the compiler with a branch condition result ascertained from an execution of the first instruction.

5. A branch prediction method of predicting an address of a second instruction to be fetched into an instruction cache when a first instruction previously fetched into the cache is a branch instruction, the method comprising:

determining whether a branch prediction of the first instruction is performed by a compiler;

performing a prediction in a Taken Mode to compute the address of the second instruction when the compiler has not performed the branch prediction of the first instruction; and storing the address of the second instruction computed based on the prediction in the Taken Mode, wherein said first instruction is one of three instructions corresponding to one conditional branch instruction, each of the three instructions represent one of the following: prediction is not performed by the compiler, predictable branch successful, and predictable branch unsuccessful respectively.

6. The method according to claim 5, further comprising predecoding of said first instruction fetched into said instruction cache to acquire said result of the former branch prediction.

7. The method according to claim 5, wherein said performing the prediction in the Taken Mode includes using a branch history table (BHT) in which a predetermined number of first saturation counters operating in the Taken Mode are arranged in correspondence to addresses.

8. The method according to claim 5, further comprising performing a prediction in an Agree Mode to compute the address of the second instruction when the compiler has performed the branch prediction of the first instruction.

9. The method according to claim 8, wherein said performing the prediction in the Agree Mode includes using a predetermined number of second saturation counters operating in the Agree Mode, and wherein a value of one of the second saturation counters is determined by comparing a value of the branch prediction of the first instruction that is predicted by the compiler with a branch condition result ascertained from an execution of the first instruction.

10. A branch prediction method of predicting an address of a second instruction to be fetched into an instruction cache when a first instruction previously fetched into the cache is a branch instruction, the method comprising:

determining whether a branch prediction of the first instruction is performed by a compiler;

performing a prediction in a Taken Mode to compute the address of the second instruction when the compiler has not performed the branch prediction of the first instruction; and storing the address of the second instruction computed based on the prediction in the Taken Mode, wherein said first instruction includes a first field representing that prediction is performed by the computer or that prediction is not performed by the compiler and a second field representing a branch successful or unsuccessful.

11. A processor comprising:

an instruction cache configured to fetch a first instruction from a program stored in a memory;

a decoding section connected to the instruction cache and configured to decode the first instruction fetched in the cache;

an executing section connected to the decoding section and configured to execute the decoded first instruction; and an address computing section connected between the instruction cache and the executing section and configured to compute an address of a second instruction to be fetched into the instruction cache when the decoded first instruction is a branch instruction, the address computing section including:

a determination device configured to determine whether a branch prediction of the first instruction is performed by a compiler;

a predicting device configured to perform a prediction in a Taken Mode to compute the address of the second instruction when the determination device has determined that the branch prediction of the first instruction is not performed by the compiler, and to perform a prediction in an Agree Mode when the determination device has determined that the branch prediction of the first instruction is performed by the compiler; and a register configured to store the address of the second instruction computed by the predicting device, wherein said first instruction is one of three instructions corresponding to one conditional branch instruction, each of the three instructions represent one of the following: prediction is not performed by the compiler, predictable branch successful, and predictable branch unsuccessful respectively.

12. A processor comprising:

an instruction cache configured to fetch a first instruction from a program stored in a memory;

a decoding section connected to the instruction cache and configured to decode the first instruction fetched in the cache;

an executing section connected to the decoding section and configured to execute the decoded first instruction; and an address computing section connected between the instruction cache and the execute section and configured to compute an address of a second instruction to be fetched into the instruction cache when the decoded first instruction is a branch instruction, the address computing section including:
- a determination device configured to determine whether a branch prediction of the first instruction is performed by a compiler;
- a predicting device configured to perform a prediction in a Taken Mode to compute the address of the second instruction when the determination device has determined that the branch prediction of the first instruction is not performed by the compiler; and
- a register configured to store the address of the second instruction computed by the predicting device, wherein said first instruction includes a first field representing a possibility that prediction is performed by the compiler or that prediction is not performed by the compiler and a second field representing a branch successful or unsuccessful.

13. A processor comprising:

an instruction cache configured to fetch a first instruction from a program stored in a memory;

a decoding section connected to the instruction cache and configured to decode the first instruction fetched in the cache;

an executing section connected to the decoding section and configured to execute the decoded first instruction; and an address computing section connected between the instruction cache and the execute section and configured to compute an address of a second instruction to be fetched into the instruction cache when the decoded first instruction is a branch instruction, the address computing section including:
- a determination device configured to determine whether a branch prediction of the first instruction is performed by a compiler;
- a predicting device configured to perform a prediction in a Taken Mode to compute the address of the second instruction when the determination device has determined that the branch prediction of the first instruction is not performed by the compiler, and to perform a prediction in an Agree Mode when the determination device has determined that the branch prediction of the first instruction is performed by the compiler; and
- a register configured to store the address of the second instruction computer by the predicting device, wherein said first instruction includes a first field representing a possibility that prediction is performed by this compiler or that prediction is not performed by the compiler and a second field representing a branch successful or unsuccessful.

* * * * *